United States Patent
Mergener et al.

(10) Patent No.: US 11,757,294 B2
(45) Date of Patent: *Sep. 12, 2023

(54) SERIES-CONNECTED BATTERY PACKS, SYSTEM AND METHOD

(71) Applicant: MILWAUKEE ELECTRIC TOOL CORPORATION, Brookfield, WI (US)

(72) Inventors: Matthew J. Mergener, Mequon, WI (US); Timothy Ryan Obermann, Waukesha, WI (US); Kevin L. Glasgow, Lomira, WI (US); Jeffrey M. Brozek, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/389,770

(22) Filed: Jul. 30, 2021

(65) Prior Publication Data

US 2021/0359526 A1 Nov. 18, 2021

Related U.S. Application Data

(63) Continuation of application No. 16/654,203, filed on Oct. 16, 2019, now Pat. No. 11,095,148, which is a
(Continued)

(51) Int. Cl.
*H02J 7/00* (2006.01)
*H02J 9/06* (2006.01)
(Continued)

(52) U.S. Cl.
CPC .............. *H02J 7/0025* (2020.01); *H02J 7/00* (2013.01); *H02J 7/0016* (2013.01);
(Continued)

(58) Field of Classification Search
None
See application file for complete search history.

(56) References Cited

U.S. PATENT DOCUMENTS

| 5,952,815 A | 9/1999 | Rouillard et al. |
| 6,046,514 A | 4/2000 | Rouillard et al. |

(Continued)

FOREIGN PATENT DOCUMENTS

EP 2477304 A1 7/2012

OTHER PUBLICATIONS

International Search Report and Written Opinion for Application No. PCT/US2017/034176 dated Sep. 8, 2017 (12 pages).

*Primary Examiner* — Leigh M Garbowski
(74) *Attorney, Agent, or Firm* — Michael Best & Friedrich LLP

(57) ABSTRACT

A power device including a housing, charging circuitry, and discharge circuitry. The housing defining a first support operable to support a first battery pack, and a second support operable to support a second battery pack. The charging circuitry electrically is connected to the first battery pack and the second battery pack in a parallel-type connection. The charging circuity is configured to simultaneously charge the first battery pack and the second battery pack. The discharge circuitry is electrically connected to the first battery pack and the second battery pack. The discharge circuitry is configured to electrically connect the first battery pack and the second battery pack in a series-type connection during a discharge.

20 Claims, 6 Drawing Sheets

Related U.S. Application Data continuation of application No. 15/603,862, filed on May 24, 2017, now Pat. No. 10,483,791.

(60) Provisional application No. 62/341,397, filed on May 25, 2016.

(51) Int. Cl.
  *H01M 10/42* (2006.01)
  *H02P 27/08* (2006.01)

(52) U.S. Cl.
  CPC .......... *H02J 7/0024* (2013.01); *H02J 7/0049* (2020.01); *H02J 7/0063* (2013.01); *H02J 9/06* (2013.01); *H01M 10/4257* (2013.01); *H02J 7/00302* (2020.01); *H02J 9/068* (2020.01); *H02J 2207/20* (2020.01); *H02P 27/08* (2013.01); *Y02E 60/10* (2013.01)

(56) References Cited

U.S. PATENT DOCUMENTS

| | | | |
|---|---|---|---|
| 6,373,225 B1 | 4/2002 | Haraguchi et al. | |
| 6,534,953 B2 | 3/2003 | Shirakawa | |
| 6,771,045 B1* | 8/2004 | Keller | H01M 10/441 |
| | | | 320/118 |
| 7,157,882 B2 | 1/2007 | Johnson et al. | |
| 7,176,654 B2 | 2/2007 | Meyer et al. | |
| 7,253,585 B2 | 8/2007 | Johnson et al. | |
| 7,425,816 B2 | 9/2008 | Meyer et al. | |
| 7,589,500 B2 | 9/2009 | Johnson et al. | |
| 7,609,031 B2 | 10/2009 | Benckenstein et al. | |
| 7,714,538 B2 | 5/2010 | Johnson et al. | |
| 7,808,131 B2 | 10/2010 | Hurst et al. | |
| 7,911,179 B2 | 3/2011 | Nakanishi | |
| 8,134,340 B2 | 3/2012 | Park | |
| 8,515,605 B2 | 8/2013 | Takaoka | |
| 8,729,957 B2 | 5/2014 | Deam | |
| 8,917,061 B2 | 12/2014 | Zhu | |
| 8,988,078 B2 | 3/2015 | Kiuchi | |
| 9,024,586 B2 | 5/2015 | Vance et al. | |
| 9,172,254 B2 | 10/2015 | Ganor | |
| 9,190,855 B2 | 11/2015 | White et al. | |
| 9,276,422 B2 | 3/2016 | Hotta | |
| 9,362,757 B2 | 6/2016 | Deal et al. | |
| 9,368,991 B2 | 6/2016 | Qahouq | |
| 9,406,915 B2 | 8/2016 | White et al. | |
| 9,450,274 B2 | 9/2016 | Vo et al. | |
| 9,455,581 B2 | 9/2016 | Wey | |
| 9,525,301 B2 | 12/2016 | White et al. | |
| 9,731,667 B2 | 8/2017 | Takaoka | |
| 9,768,625 B2 | 9/2017 | Sakakibara | |
| 10,017,057 B2 | 7/2018 | Nelson | |
| 10,044,069 B2 | 8/2018 | Despesse | |
| 10,097,035 B2 | 10/2018 | Harada et al. | |
| 10,128,674 B2 | 11/2018 | Nelson | |
| 10,193,359 B2 | 1/2019 | Ganor | |
| 10,211,488 B2 | 2/2019 | Willgert et al. | |
| 10,250,178 B2 | 4/2019 | White et al. | |
| 10,361,651 B2 | 7/2019 | White et al. | |
| 10,389,139 B2 | 8/2019 | Velderman et al. | |
| 10,431,996 B2 | 10/2019 | Liu | |
| 10,651,660 B2 | 5/2020 | Ganor | |
| 10,749,430 B2 | 8/2020 | Gao et al. | |
| 2004/0135544 A1 | 7/2004 | King et al. | |
| 2005/0275372 A1 | 12/2005 | Crowell | |
| 2008/0118819 A1 | 5/2008 | Gamboa et al. | |
| 2009/0139781 A1* | 6/2009 | Straubel | B60L 53/14 |
| | | | 701/22 |
| 2009/0153097 A1 | 6/2009 | Song et al. | |
| 2009/0289599 A1 | 11/2009 | White et al. | |
| 2010/0213897 A1 | 8/2010 | Tse | |
| 2012/0041624 A1* | 2/2012 | Stewart | B60L 3/0061 |
| | | | 903/903 |
| 2012/0083948 A1* | 4/2012 | Tate, Jr. | B60L 58/12 |
| | | | 701/22 |
| 2012/0091731 A1 | 4/2012 | Nelson | |
| 2012/0299548 A1 | 11/2012 | Takahashi et al. | |
| 2012/0306506 A1 | 12/2012 | Kiuchi | |
| 2013/0038289 A1 | 2/2013 | Tse | |
| 2014/0017528 A1 | 1/2014 | Uehara et al. | |
| 2014/0125284 A1 | 5/2014 | Qahouq | |
| 2014/0184161 A1 | 7/2014 | Deal et al. | |
| 2014/0265604 A1* | 9/2014 | Mergener | H02J 7/34 |
| | | | 307/80 |
| 2014/0300311 A1 | 10/2014 | Caren et al. | |
| 2014/0312828 A1 | 10/2014 | Vo et al. | |
| 2015/0037634 A1 | 2/2015 | Malcolm et al. | |
| 2016/0020443 A1 | 1/2016 | White et al. | |
| 2016/0099575 A1 | 4/2016 | Velderman et al. | |
| 2020/0052524 A1 | 2/2020 | Mergener et al. | |
| 2020/0144830 A1 | 5/2020 | Muenzel et al. | |
| 2020/0382045 A1 | 12/2020 | White et al. | |

\* cited by examiner

SERIES-CONNECTED BATTERY PACKS, SYSTEM AND METHOD

RELATED APPLICATION

The present application is a continuation of and claims the benefit of priority from U.S. patent application Ser. No. 16/654,203, filed Oct. 16, 2019, which is a continuation of and claims the benefit of priority from U.S. patent application Ser. No. 15/603,862, filed May 24, 2017, now U.S. Pat. No. 10,483,791, which claims the benefit of priority from U.S. Provisional Patent Application No. 62/341,397, filed May 25, 2016, the entire contents of each of which are hereby incorporated by reference in their entireties.

FIELD

The present invention relates to battery power sources and battery-powered devices and, more particularly, to series-connected battery packs in such power sources and devices.

SUMMARY

To provide a desired operating voltage, two or more battery packs may be connected in series. When connected in series, the voltage of each pack is added to a total terminal voltage of the system. However, operation of series-connected battery packs is generally limited by the pack having the lowest capacity.

For battery packs including lithium-based battery cells, discharge of series-connected packs is stopped when one of the packs is disabled, for example, because the pack has reached an end of discharge condition (e.g., state of charge (SOC) below a threshold), is experiencing an abnormal condition (e.g., excessive temperature, cell voltage drop, etc.). This requirement presents challenges with series-connected battery packs, especially with packs having different capacities, different states of charge, etc. When one pack reaches its end of discharge condition, the other battery pack(s) will have remaining capacity that will not be harnessed by the system.

In some aspects, one or more solutions to maximize the discharge energy of series-connected battery packs in a system may be provided. In some aspects, an ability to mix and match packs with different capacities, different states of charge, different nominal voltages, etc. in the system may be provided.

In some embodiments, the system may be controlled to work at less than full capacity of battery packs. For example, a proportional discharge energy may be drawn from each pack based upon the capacity/condition of the pack so that the packs reach end of discharge substantially simultaneously. In another example, the pack at its end of discharge may be disconnected from the circuit, after which operation of the system is continued through to end of discharge of all series-connected packs in the system.

In some embodiments, the system may provide a charge platform so that, during charging, each battery pack is brought to substantially the same state of charge. For example, the platform may provide a series connection between the battery packs during discharge, and, during charging, each battery pack may be connected independently or in a parallel connection to a power source. The charge platform may not address different capacities between the battery packs.

In one independent aspect, a battery power device may generally include a housing defining a first support operable to support a first battery pack, and a second support operable to support a second battery pack; a circuit selectively electrically connecting the first battery pack and the second battery pack in series, the circuit including an output terminal to provide an output voltage to a powered device, a first bypass portion operable to selectively electrically disconnect the first battery pack from the circuit, and a second bypass portion operable to selectively electrically disconnect the second battery pack from the circuit; and a boost converter electrically connected to the circuit and operable to boost a voltage at the output terminal.

In some embodiments, the boost converter is selectively electrically connected in series with the first battery pack and the second battery pack, the boost converter being operable to boost a first voltage of the first battery pack and a second voltage of the second battery pack to the output voltage.

The first battery pack may have a first nominal voltage, and the second battery pack may have a second nominal voltage different than the first nominal voltage. The first battery pack may have a first capacity, and the second battery pack may have a second capacity different than the first capacity. The first battery pack may have a first state of charge, and the second battery pack may have a second state of charge different than the first state of charge.

In another independent aspect, a power system may generally include a first battery pack; a second battery pack; and a battery power device operable to provide an output voltage to a powered device. The battery power device may generally include a housing defining a first support operable to support the first battery pack, and a second support operable to support the second battery pack, a circuit selectively electrically connecting the first battery pack and the second battery pack in series, the circuit including an output terminal to provide the output voltage to the powered device, a first bypass portion operable to selectively electrically disconnect the first battery pack from the circuit, and a second bypass portion operable to selectively electrically disconnect the second battery pack from the circuit, and a boost converter electrically connected to the circuit and operable to boost a voltage at the output terminal.

In yet another independent aspect, a method of powering a powered device may generally include selectively electrically connecting a first battery pack and a second battery pack in a circuit in series; providing an output voltage at an output terminal; boosting a voltage at the output terminal; and, when one of the first battery pack and the second battery pack reaches an end of discharge condition, selectively electrically disconnecting the one of the first battery pack and the second battery pack from the circuit.

In some embodiments, boosting may include selectively electrically connecting a boost converter in series with the first battery pack and the second battery pack, and operating the boost converter to boost a first voltage of the first battery pack and a second voltage of the second battery pack to the output voltage. Selectively electrically connecting may include selectively electrically connecting in the circuit in series a first battery pack having one of a first nominal voltage, a first capacity, and a first state of charge and with a second battery pack having a corresponding one of a second nominal voltage, a second capacity, and a second state of charge different than the first.

The method may include removably connecting the first battery pack to a housing of the device and/or removably connecting the second battery pack to the housing of the device.

Selectively electrically disconnecting may include determining characteristics or condition of the first battery pack, and controlling operation of a bypass portion. When the first battery pack is to be disabled, controlling may include disconnecting the first battery pack from the circuit. When another battery pack is substituted for a disabled first battery pack, controlling may include determining whether to control the bypass portion to connect the other battery pack to the circuit.

The method may include determining an input voltage of the powered device, and wherein boosting includes boosting the voltage at the output terminal to the input voltage.

In a further independent aspect, a battery power device may generally include a housing assembly defining a first support operable to support a first battery pack, and a second support operable to support a second battery pack; a discharge circuit including an output terminal to provide an output voltage to a powered device and selectively electrically connecting the first battery pack and the second battery pack in series for discharging; and charging circuitry including an input terminal to receive power from a power source and selectively electrically connecting the first battery pack and the second battery pack to the power source for charging.

A switch arrangement may be provided to selectively and alternatively electrically connect the first battery pack and the second battery pack to the discharge circuit and to the charging circuitry. The device may include a controller operable to control the switch arrangement based on a signal indicative of a connection status of one of the output terminal and the input terminal. The switch arrangement may include an actuator operable by a user.

In some constructions, the housing assembly includes a removable carrier portion providing the first support and the second support, the charging circuitry being supported by the removable carrier portion.

For charging, the battery packs may be connected in parallel by the charging circuitry. The battery packs may be independently charged by the charging circuitry. During a charging cycle, the battery packs may be charged by the charging circuitry to approximately the same state-of-charge and/or to approximately the same capacity.

In another independent aspect, a battery power device may generally include a housing defining a first support operable to support a first battery pack, and a second support operable to support a second battery pack; a discharge circuit selectively connecting the first battery pack and the second battery pack in series, the discharge circuit including an output terminal to provide an output voltage to a powered device; and a balance circuit selectively connected to the first battery pack and the second battery pack, the balance circuit being operable to transfer energy between the first battery pack and the second battery pack.

The device may include a controller operable to control operation of the balance circuit. The controller may be operable to determine a non-use condition of the discharge circuit, and operate the balance circuit during the non-use condition.

In yet another independent aspect, a battery power device may be used with a multi-phase motor and may generally include a housing defining a first support operable to support a first battery pack, a second support operable to support a second battery pack; a first switch arrangement between the first battery pack and the motor; and a second switch arrangement between the second battery pack and the motor, the first switch arrangement and the second switch arrangement being operable to selectively connected the first battery pack and the second battery pack across each phase of the motor, the first switch arrangement and the second switch arrangement being operated to provide the required energy from at least one of the first battery pack and the second battery pack to each phase of the motor.

In another independent aspect, a power device includes a housing and charging circuitry. The housing defining a first support operable to support a first battery pack, and a second support operable to support a second battery pack. The charging circuitry electrically is connected to the first battery pack and the second battery pack in a parallel-type connection. The charging circuity is configured to simultaneously charge the first battery pack and the second battery pack.

In yet another independent aspect, a method of operating a power device includes receiving, via a first support, a first battery pack, and receiving, via a second support, a second battery pack. The method further includes electrically connecting the first battery pack to a charging circuitry in a parallel-type electrical connection, electrically connecting the second battery pack to the charging circuitry in a parallel-type electrical connection. The method further includes simultaneously charging, via the charging circuitry, the first battery pack and the second battery pack.

Other independent aspects of the invention may become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Figure 1:
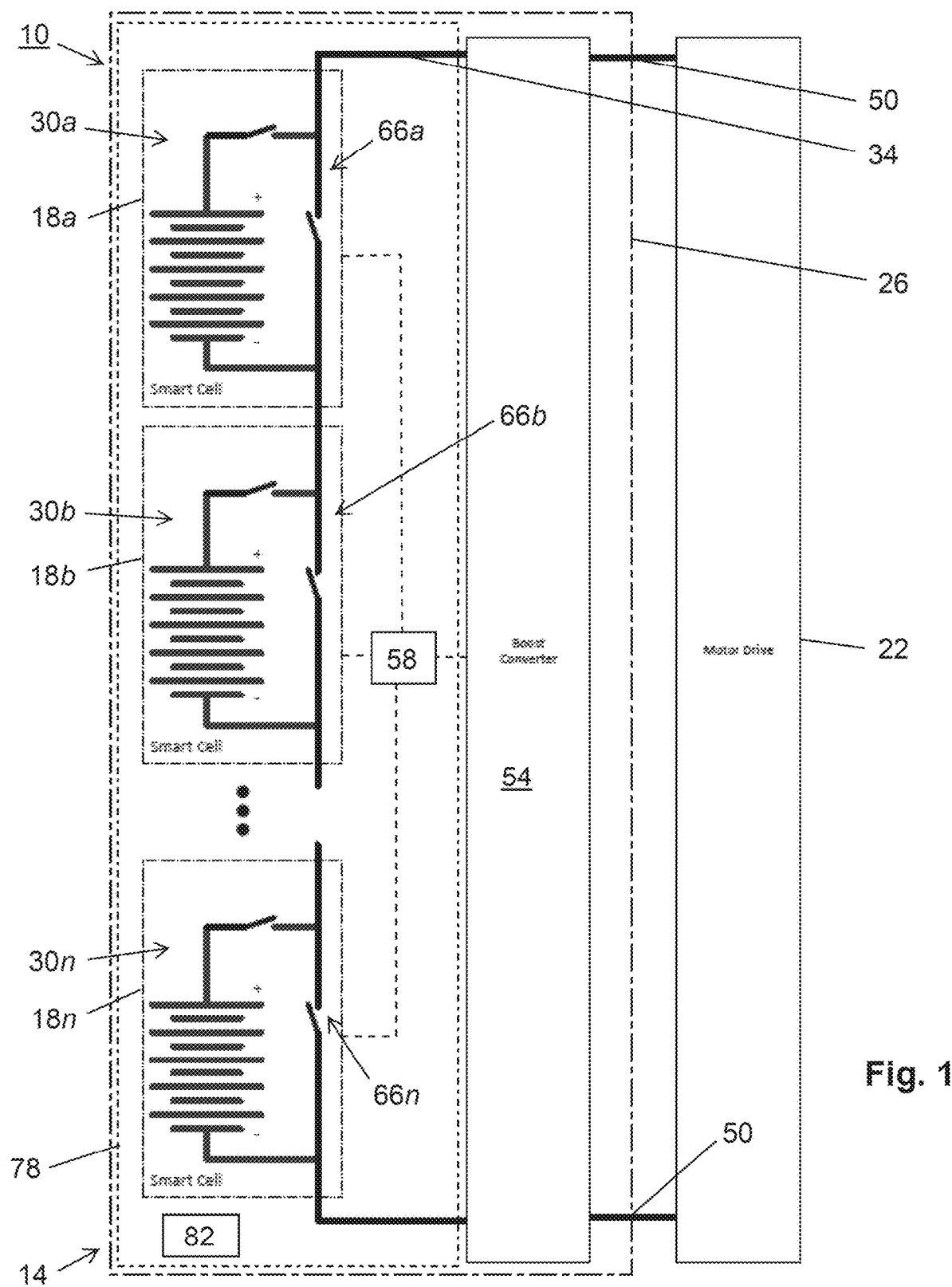
FIG. 1 is a schematic view of a power system including serially-connected battery packs.
Figure 2:
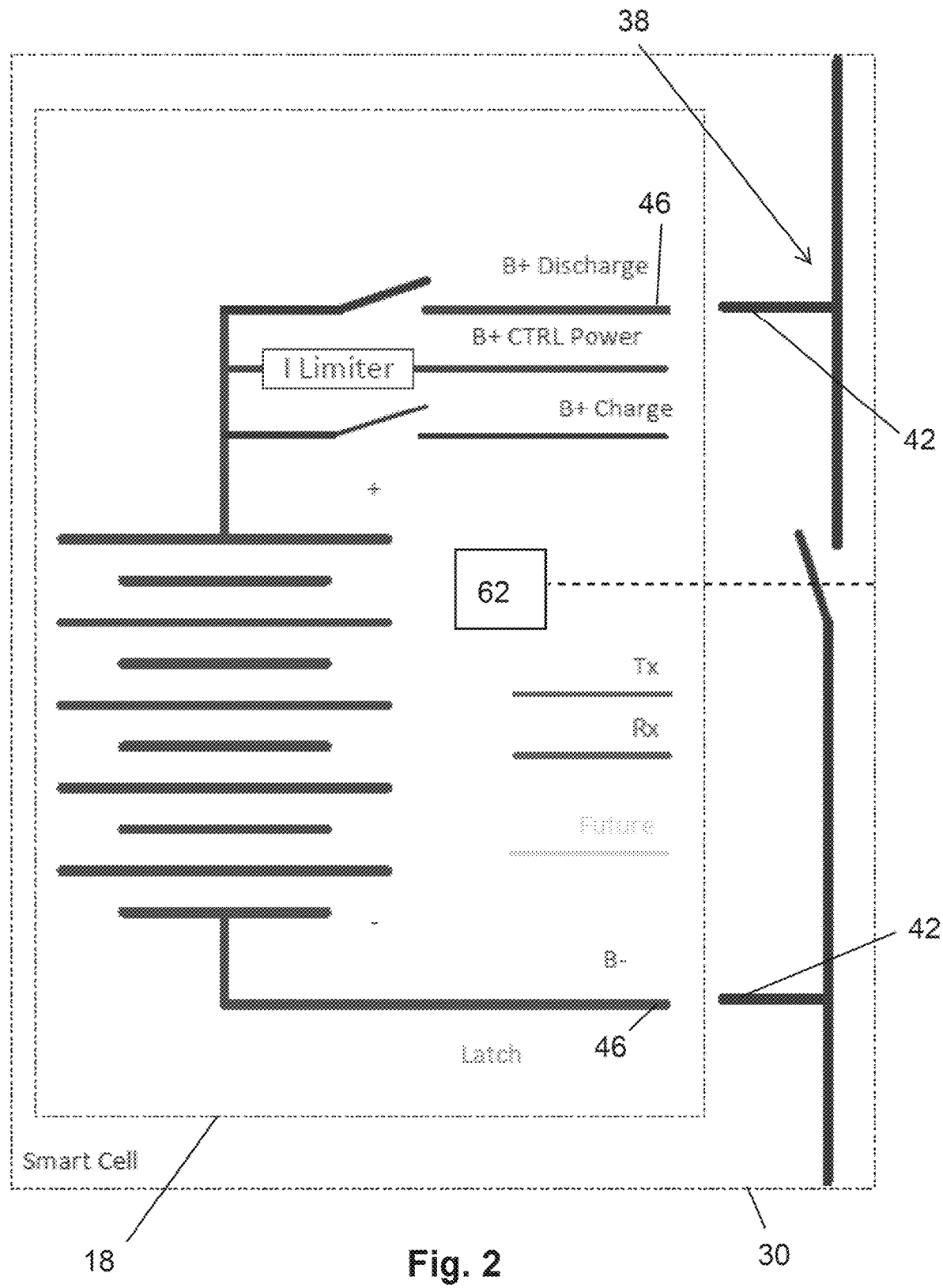
FIG. 2 is a schematic view of a portion of the system shown in FIG. 1.

FIGS. 1-2 illustrate a battery power system 10 including a battery power device 14 supporting and electrically connecting a number of separate battery packs 18a, 18b . . . 18n in series and operable to provide an output voltage to a powered device 22. The system 10 is operable as a power source for various heavy-duty, high-voltage devices, including power tools similar to corded AC power tools, such as miter saws, planers, band saws, diamond coring motors, drills, grinders, magnetic drill presses, rotary and demolition hammers, compressors, etc., outdoor power equipment, such as string trimmers, blowers, hedge trimmers, lawn mowers, chain saws, pressure washers, wood chippers, snow blowers, etc. The system 10 may be constructed with an output or an auxiliary output and be operable to provide power in a manner similar to a generator.

The device 14 includes a housing assembly 26 defining a number of battery pack bays or support portions 30a, 30b . . . 30n, each operable to support a battery pack 18. The device 14 includes a circuit 34 supported by the housing assembly 26 and operable to selectively connect the supported battery packs 18 in series. The circuit 34 includes, for each support portion 30, (see FIG. 2) a circuit portion 38 with terminals 42 operable to electrically connect to terminals 46 of the supported battery pack 18. The circuit 34 includes (see FIG. 1) output terminals 50 electrically connectable to the powered device 22 (e.g., a motor/drive of a power tool (e.g., the motor 90 (see FIG. 5), a machine, etc.) to provide an output voltage to the powered device 22.

A boost converter 54 is electrically connected to the circuit 34 and operable to boost a voltage across the output terminals 50. In the illustrated construction, the boost converter 54 is selectively connected in the circuit 34 in series with the circuit portions 38. The boost converter 54 is operable to boost the voltage of the battery pack(s) 18 to the output voltage.

In the illustrated construction, the boost converter 54 boosts the input voltage of the supported battery pack(s) 18 to a set or desired output voltage (e.g., 120V, 240 V, 400 V, etc.). Regardless of the input voltage to the circuit 34 (e.g., number of supported battery packs 18, state-of-charge of the supported battery pack(s) 18, nominal voltage of the supported battery pack(s) 18, etc.), the output voltage of the device 14 is the same—the set output voltage provided by the boost converter 54. Because the output voltage covers a wide range of common voltages used worldwide (e.g., 110 V to 240 V), the device 14 may provide a universal power source.

In other constructions (not shown), the boost converter 54 may be provided by distributed boost converters (not shown; e.g., a boost converter being provided for each circuit portion 38). In such constructions, each separate boost converter is operable to boost the voltage of an associated supported battery pack 18 to a set or desired voltage for the battery pack 18.

A controller 58 is electrically connected to the circuit 34 and is operable to configure, communicate with and/or control the system 10 and components of/connected to the system 10. In the illustrated construction, the controller 58 is operable to determine characteristics and/or conditions of the battery pack(s) 18 connected to the circuit 34. In the illustrated construction, each battery pack 18 includes (see FIG. 2) a pack controller 62, and the controller 58 is operable to communicate with each pack controller 62 to determine characteristics (e.g., nominal voltage, capacity, cell chemistry, etc.) and/or conditions (e.g., state-of-charge, temperature, etc.) of the associated battery pack 18.

The controller 58 (and the controller(s) 62) includes combinations of hardware and software. The controller 58 includes a processing unit (e.g., a microprocessor, a microcontroller, or another suitable programmable device), non-transitory computer-readable media, and an input/output interface. The processing unit, the media, and the input/output interface are connected by one or more control and/or data buses. The computer-readable media stores program instructions and data. The processing unit is configured to retrieve instructions from the media and execute the instructions to perform the control processes and methods described herein.

The input/output interface transmits data from the controller 58 to external systems, networks, and/or devices and receives data from external systems, networks, and/or devices. The input/output interface stores data received from external sources to the media and/or provides the data to the processing unit.

The circuit 34 includes a bypass portion 66a, 66b . . . 66n operable to selectively disconnect each associated supported battery pack 18a, 18b . . . 18n from the circuit 34. In the illustrated construction, when it is determined that a battery pack 18a, 18b . . . 18n is to be disabled (e.g., has reached an end of discharge threshold, is experiencing an abnormal condition, etc.), the controller 58 controls the associated bypass portion 66a, 66b . . . 66n to disconnect the battery pack 18a, 18b . . . 18n from the circuit 34. After the disabled battery pack is disconnected, operation of the system 10 is able to continue through to end of discharge of all remaining series-connected packs 18a, 18b . . . 18n in the system 10.

Each bypass portion 66a, 66b . . . 66n may include one or more switches, such as, for example, a XOR switches, operable so that the associated battery pack 18a, 18b . . . 18n is normally connected in series in the circuit 34 (a "connected" condition) and is disconnected when the battery pack 18a, 18b . . . 18n is disabled (a "disconnected" condition). This arrangement forms a "smart cell" so that the associated battery pack 18a, 18b . . . 18n is either put in the circuit 34 or bypassed. The battery packs 18a, 18b . . . 18n may be switched into and out of the circuit 34 based on disabling of the battery pack 18a, 18b . . . 18n (e.g., SOC, temperature, etc.) This arrangement allows all battery packs 18a, 18b . . . 18n in the system 10 to be completely discharged.

If a battery pack 18a, 18b . . . 18n is disconnected from the circuit 34 before end of discharge (e.g., due to an abnormal condition), the controller 58 may control the associated bypass portion 66a, 66b . . . 66n to again connect the battery pack 18a, 18b . . . 18n to the circuit 34 if it is determined that the condition has been removed and the battery pack 18a, 18b . . . 18n is operational.

If another battery pack (not shown) is substituted for a disconnected battery pack 18a, 18b . . . 18n, the substituted battery pack may be connected to the circuit 34. For example, the controller 58 may communicate with the substituted battery pack (e.g., with its battery pack controller (not shown)) to determine whether the battery pack is operational (not disabled due to SOC, an abnormal condition, etc.) and, if the battery pack is determined to be operational, control the associated bypass portion 66a, 66b . . . 66n to connect the substituted battery pack to the circuit 34.

Alternatively, when a battery pack 18a, 18b . . . 18n is removed from its support portion 30a, 30b . . . 30n, the associated bypass portion 66a, 66b . . . 66n may reset to the connected condition. During subsequent operation, the associated bypass portion 66a, 66b . . . 66n would then be controlled as described above based on the condition of the substituted battery pack.

The controller 58 is electrically connected to the boost converter 54 and is operable to communicate with and control the boost converter 54. The boost converter 54 can be controlled to boost the input voltage (of the battery pack(s) battery pack 18a, 18b . . . 18n) as necessary based on the load of the powered device 22.

The powered device 22 may also include a controller (not shown) communicating with the controller 58. The powered device controller may communicate information relating to the powered device 22 (e.g., the load, a desired input voltage, a desired motor speed (when the powered device 22 includes a motor), etc.) to the controller 58. Based on this information, the controller 58 controls the boost converter 54 to supply the necessary voltage to the powered device 22.

For example, normally, to reduce the speed of a motor, the input voltage to the motor is modulated through pulse-width modulation (PWM) to get a lower average voltage, resulting in a lower speed. With the battery power device 14 including the boost converter 54, because the boost converter 54 provides the input voltage to the motor, the motor could send a request (e.g., through the powered device controller) to the boost converter 54 (e.g., to the controller 58) that it needs a given input voltage, speed, etc. (e.g., 75%). In such a case, rather than being partially on (e.g., 75%) by pulse-width modulating the motor switches/transistors, the motor would run "full on" but at a slower speed because the input voltage from the boost converter 54 is lower. This operation eliminates switching losses, heat, etc., associated with PWM of the motor.

Each battery pack 18a, 18b . . . 18n can have any battery chemistry such as, for example, lead acid, Nickel-cadmium ("NiCd"), Nickel-Metal Hydride ("NiMH"), Lithium ("Li"), Lithium-ion ("Li-ion"), another Lithium-based chemistry or another rechargeable or nonrechargeable battery chemistry. In the illustrated constructions, the battery packs 18a, 18b . . . 18n can have a battery chemistry of Li, Li-ion or another Li-based chemistry and can supply an average discharge current equal to or greater than approximately 20 A and generally up to 100 A or more. For example, in the illustrated construction, the battery packs 18a, 18b . . . 18n can have a chemistry of Lithium Cobalt ("Li—Co"), Lithium Manganese ("Li—Mn") Spinel or Li—Mn Nickel.

Each battery pack 18a, 18b . . . 18n has a number of cells electrically connected to provide a nominal voltage (e.g., 12 V, 18 V, 20 V, 28 V, 36 V, 40 V, 56 V, 60 V, 120 V, etc.) for the pack 18, and, in the system 10, the battery packs 18 may have different nominal voltages. Also, each battery pack 18a, 18b . . . 18n has a state-of-charge (e.g., fully charged to end of discharge threshold), and, in the system 10, the battery packs 18a, 18b . . . 18n may have different states-of-charge. In addition, each battery pack 18a, 18b . . . 18n has a capacity (e.g., 2 Ah, 4 Ah, etc.), and, in the system 10, the battery packs 18a, 18b . . . 18n may have different capacities (based on different capacity cells, parallel-connected cells, etc.).

For example, one battery pack 18a may have one nominal voltage (e.g., 18 V), while another battery pack 18b has a different nominal voltage (e.g., 56 V). Also, one battery pack 18a may have one state-of-charge (e.g., fully charged (100% SOC)) while another battery pack 18b has a different SOC (e.g., 75% SOC). In this example, the system 10 operates with the boost converter 54 to provide the set output voltage (e.g., 400 V) with the input voltage provided by the 18 V battery pack 18a and the 56 V battery pack 18b (and any other connected battery pack(s) 18), regardless of the relative states-of-charge of and capacity of the pack(s) battery packs 18a, 18b . . . 18n.

Figure 3:
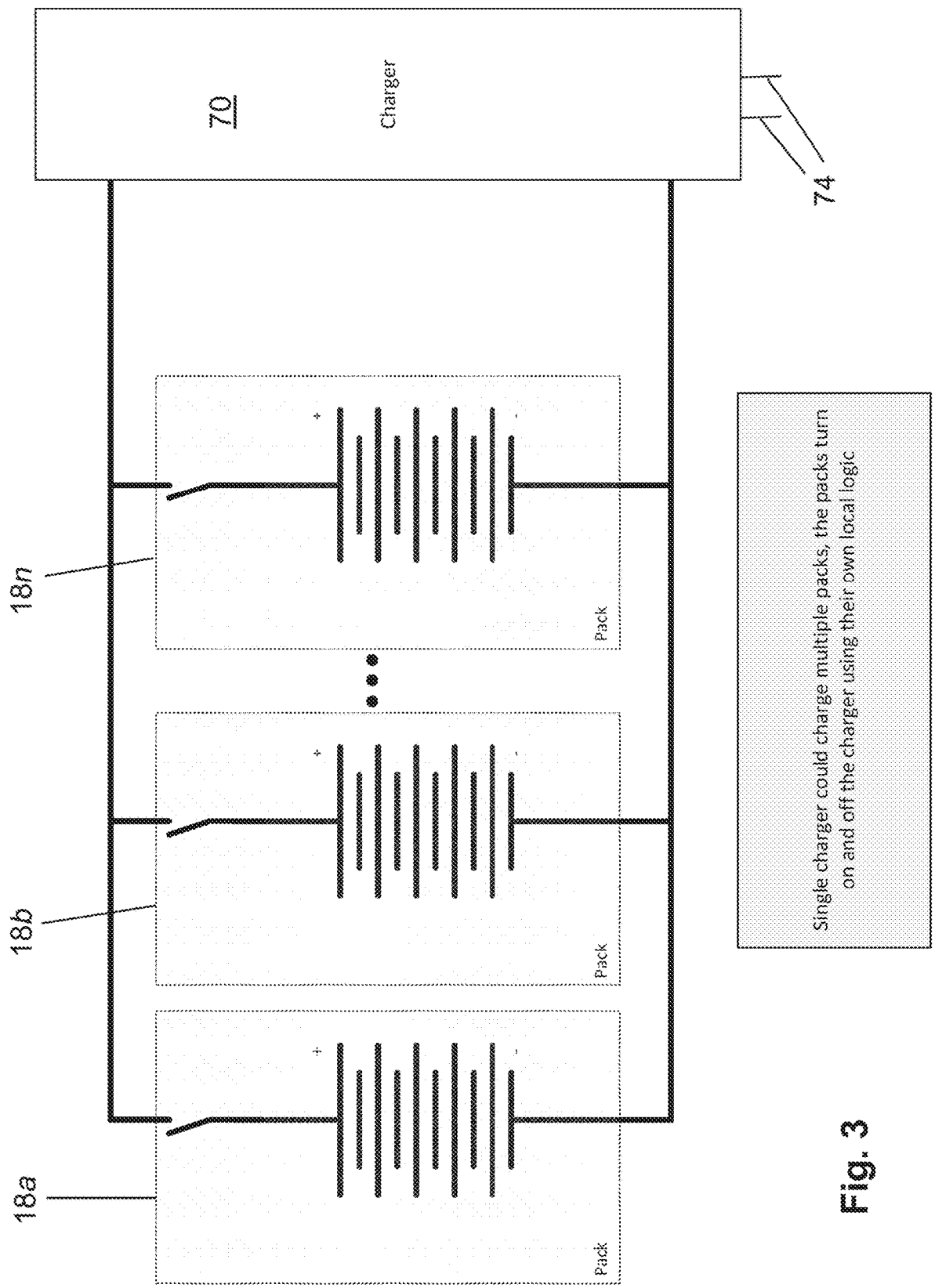
FIG. 3 is a schematic view of charging circuit for a power system, such as the system of FIG. 1.

FIG. 3 illustrates a charging arrangement for the multiple battery packs, such as the battery packs 18a, 18b . . . 18n shown in FIGS. 1-2. It should be understood that the illustrated charging arrangement may be used with or independently of the boost arrangement described above.

As shown in FIG. 3, for charging, the battery packs 18a, 18b . . . 18n are connected in parallel to charging circuitry 70. The charging circuitry 70 includes input terminals 74 connectable to a power source (not shown) to provide power the charging circuitry 70. In other constructions (not shown), the charging circuitry 70 may independently connect the battery packs 18a, 18b . . . 18n to the power source so that each battery pack 18a, 18b . . . 18n is independently and separately charged.

The charging circuitry 70 may be supported in the housing assembly 26 of the device 14 so that the housing assembly 26 provides a unitary discharging/charging carrier/platform. The housing assembly 26 may be include (see FIG. 1) a carrier portion 78 providing the support portions 30a, 30b . . . 30n and supporting the battery packs 18a, 18b . . . 18n as a unit. The carrier portion 78 with the battery packs 18a, 18b . . . 18n can be separated from the remainder of the housing assembly 26 and transported as a unit between different work sites, a charging location, etc. The carrier portion 78 may be constructed to be used with multiple devices 14 (one shown) and may be interchanged between devices 14.

During discharge operations, the battery packs 18a, 18b . . . 18n are selectively connected in series in the circuit 34 to provide power at the output terminals 50 (a "discharge" condition of the device 14). When the battery packs 18a, 18b . . . 18n are to be charged, the battery packs 18a, 18b . . . 18n are disconnected from the series connection in the circuit 34 and connected in parallel (or independently) to the charging circuitry 70 (a "charge" condition of the device 14). An indicator 82 (see FIG. 1) provides an indication (visual, audible, tactile, combinations thereof, etc.) of the discharge/charge condition of the device 14.

During charging, each battery pack 18a, 18b . . . 18n is charged independently to avoid overcharging the higher SOC pack(s) 18a, 18b . . . 18n while sufficiently charging the lower SOC pack(s) 18a, 18b . . . 18n and to thereby bring the battery packs 18a, 18b . . . 18n to substantially the same state of charge (given sufficient charging time). When a battery pack 18a, 18b . . . 18n is fully charged, the battery pack 18a, 18b . . . 18n may be disconnected from the power source to avoid overcharging.

During charging, the charging circuitry 70 may charge all battery packs 18a, 18b . . . 18n to the same capacity, rather than state-of-charge. The controller 58 communicates with and determines the capacity of the battery packs 18a, 18b . . . 18n. The charging circuitry 70 is controlled to only apply the capacity that the smallest capacity battery pack 18a, 18b . . . 18n can receive, and all battery packs 18a, 18b . . . 18n are charged to that capacity. During operation, the series-connected battery packs 18a, 18b . . . 18n are able to be discharged to the same capacity, that of the lowest capacity battery pack 18a, 18b . . . 18n. While runtime of the other battery packs 18a, 18b . . . 18n may be sacrificed with this arrangement, additional components for a balancing circuit, as described below, and the associated costs are not required.

In order to provide selective series discharging along with parallel charging, a switch arrangement (not shown) is provided to change the connection of the battery packs 18a, 18b . . . 18n as necessary for discharging and charging. Generally, when the input terminals 74 are connected to the power source, the output terminals 50 are disconnected from the battery packs 18a, 18b . . . 18n, and the battery packs 18a, 18b . . . 18n are connected in parallel. When the battery packs 18a, 18b . . . 18n are disconnected from the power source (e.g., by disconnecting the input terminals 74 from the battery packs 18a, 18b . . . 18n or by disconnecting the input terminals 74 from the power source), the battery packs 18a, 18b . . . 18n are connected in series and to the output terminals 50.

In some constructions, the controller 58 may control the switch arrangement based on information relating to the operation of the device 14. The controller 58 may, for example, determine or receive a signal indicative of the connection status of the input terminals 74 relative to the power source and/or the output terminals 50 relative to the powered device 22 and control the switch arrangement accordingly. As another example, when the connected battery packs 18a, 18b . . . 18n are discharged or disabled, the controller 58 may control the switch arrangement to the charge condition, regardless of the connection status of the terminals 50, 74, until the battery packs 18a, 18b . . . 18n are sufficiently charged for discharging operations.

In other constructions, the switching arrangement may be user actuated. An actuator may be connected to the switch arrangement and/or to the controller 58 to select the discharge condition or the charged condition. When the connected battery packs 18a, 18b . . . 18n are discharged or disabled, the user may be prevented from selecting the discharge condition (e.g., by the controller 58) until the battery packs 18a, 18b . . . 18n are sufficiently charged for discharging operations.

Figure 4:
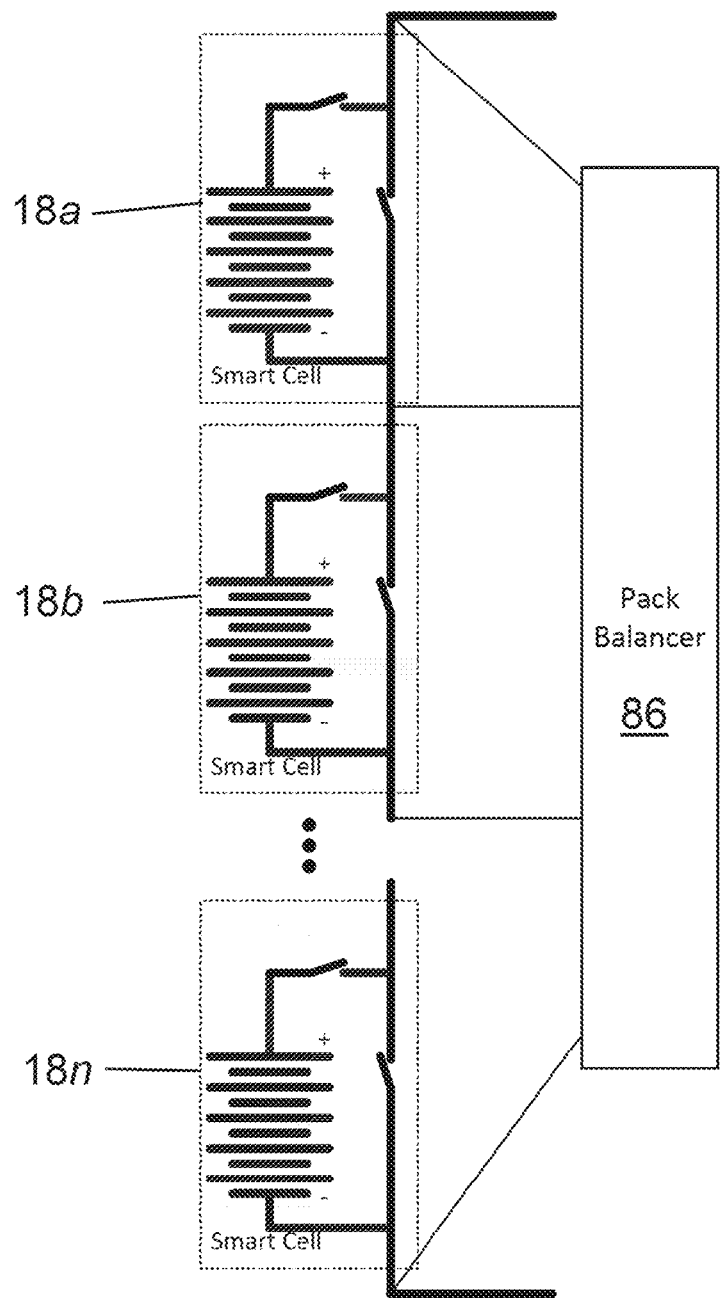
FIG. 4 is a schematic view of a balancing circuit for a power system, such as the system of FIG. 1.

FIG. 4 illustrates a balancing arrangement for the multiple battery packs, such as the battery packs 18a, 18b . . . 18n shown in FIGS. 1-2, operable to rebalance the battery packs 18a, 18b . . . 18n. It should be understood that the illustrated balancing arrangement may be used with or independently of the boost arrangement and/or the charging arrangement described above.

A balancing circuit 86 is selectively connected to the battery packs 18a, 18b . . . 18n. The balancing circuit 86 may include an isolated DC-DC power converter. The balancing circuit 86 operates to transfer energy from the high SOC battery pack(s) 18a, 18b . . . 18n to the low SOC battery pack(s) 18a, 18b . . . 18n to balance the battery packs 18a, 18b . . . 18n (e.g., to within 10% state-of-charge).

The balancing circuit 86 may be selectively connected to and disconnected from the battery packs 18a, 18b . . . 18n. A switch arrangement (not shown) may be provided to operate the device 14 between a "balancing" condition, in which the balancing circuit 86 is connected to the battery packs 18a, 18b . . . 18n and is operable to balance the battery packs 18a, 18b . . . 18n, and an "inoperable" condition, in which the balancing circuit 86 is not operable to balance the battery packs 18a, 18b . . . 18n (e.g., is disconnected).

The balancing circuit 86 would generally operate in the background (e.g., when the device 14 is not being discharged) and take some time (e.g., 15 minutes or more depending on the relative SOCs of the battery packs 18a, 18b . . . 18n) to balance the battery packs 18a, 18b . . . 18n. Use of the balancing circuit 86 may improve the runtime of the system 10 by maximizing the energy available from all of the battery packs 18a, 18b . . . 18n when they are discharged in series.

The controller 58 may control operation of the balancing circuit 86 (e.g., connection of the switch arrangement) based on information relating to the operation of the device 14. For example, the controller 58 may determine non-use and/or predict periods of non-use (e.g., off-peak hours) sufficient to operate the balancing circuit 86.

Because cells can discharge at higher rates than when charged, the balancing circuit 86 can operate more quickly (fast balance) by discharging the higher SOC battery pack(s) 18a, 18b . . . 18n to power a charging circuit to charge the lower SOC battery pack(s) 18a, 18b . . . 18n. In such constructions, the balancing circuit 86 includes a charging circuit (not shown) to be powered by the higher SOC battery pack(s) 18a, 18b . . . 18n.

Figure 5:
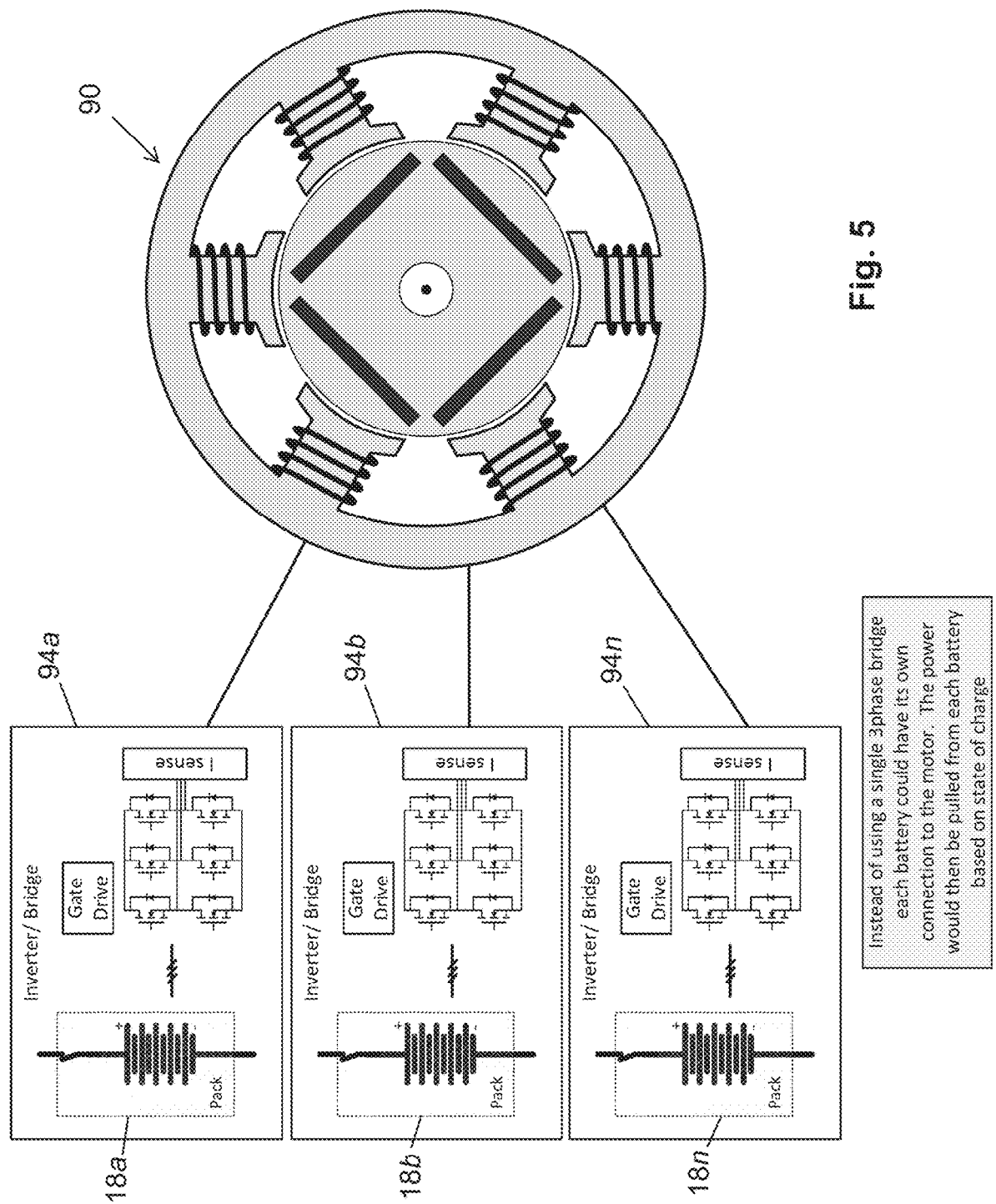
FIG. 5 is a schematic view of a matrix converter of a power system.
Figure 6:
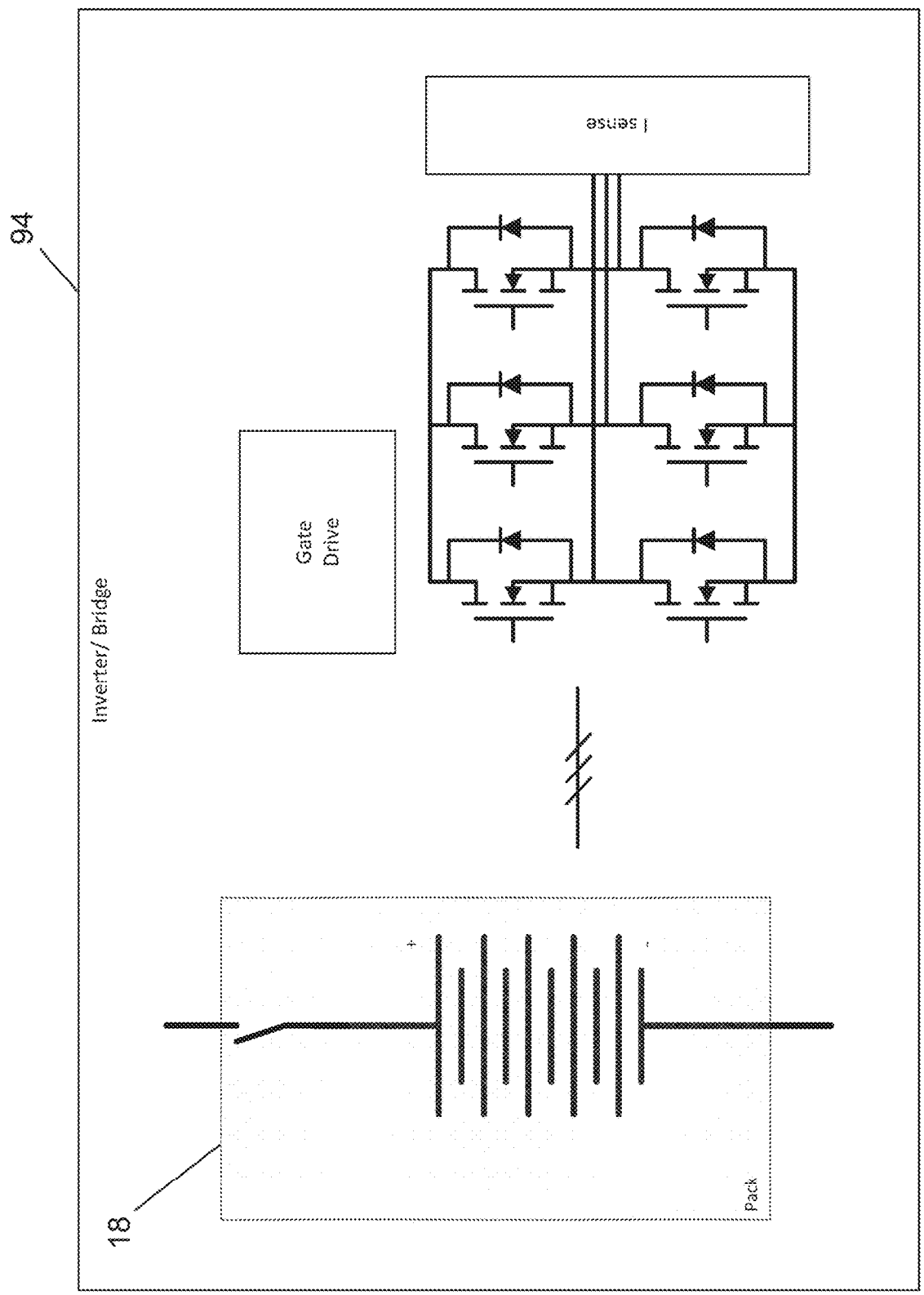
FIG. 6 is a schematic view of an inverter/bridge of the matrix converter shown in FIG. 5.

FIGS. 5-6 illustrate a matrix power arrangement for a multi-phase motor 90 in which energy is drawn from each battery pack 18a, 18b . . . 18n based on its state of charge and applied to the motor 90. In the illustrated construction, each battery pack 18a, 18b . . . 18n has its own connection to the motor 90. An inverter/bridge 94a, 94b . . . 94n is provided between each battery pack 18a, 18b . . . 18n and the motor 90.

The battery packs 18a, 18b . . . 18n are selectively connected across each phase of the motor 90, and switching is operated to provide the required energy to each phase of the motor 90. With the illustrated arrangement, the battery packs 18a, 18b . . . 18n can be connected in series and/or parallel combinations with the motor 90 to achieve the desired runtime/power output with battery packs 18a, 18b . . . 18n having different SOCs, capacities, nominal voltages, etc. The arrangement may include a DC-DC converter bypass element for lower power dissipation.

The operation, construction and charging of battery packs, including those with lithium-based battery cells, are described and illustrated in U.S. Pat. No. 7,157,882, issued Jan. 2, 2007; U.S. Pat. No. 7,253,585, issued Aug. 7, 2007; U.S. Pat. No. 7,176,654, issued Feb. 13, 2007; U.S. Pat. No. 7,589,500, issued Sep. 15, 2009; U.S. Pat. No. 7,714,538, issued May 11, 2010; and U.S. Pat. No. 7,425,816, issued Sep. 16, 2008; the entire contents of all of which are hereby incorporated by reference.

Thus, the invention provides, among other things, a battery power device, system and method with series-connected battery packs. A boost converter may convert the voltage of the series-connected battery packs to a set output voltage. The battery packs may be selectively connected in series for discharging and in parallel for charging. A balance circuit may transfer energy between the battery packs to balance the states of charge of the battery packs. In a matrix power arrangement, multiple battery packs are selectively connected across each phase of the motor, and switching is operated to provide the required energy to each phase of the motor.

One or more independent advantages and/or independent features may be set forth in the following claims.

What is claimed is:

1. A battery discharge device comprising:
   a housing defining a first support operable to support a first battery pack, and a second support operable to support a second battery pack;
   discharge circuitry selectively connecting the first battery pack and the second battery pack in series, the discharge circuitry including an output terminal to provide an output voltage to a powered device; and
   balance circuitry selectively connected to the first battery pack and the second battery pack, the balance circuitry being operable to transfer energy between the first battery pack and the second battery pack.

2. The battery discharge device of claim 1, wherein the balance circuitry includes an isolated direct current (DC)-DC power converter.

3. The battery discharge device of claim 1, wherein the balancing circuitry is configured to transfer energy from a higher state of charge (SOC) battery pack of the first battery pack and the second battery pack, to a lower SOC battery pack of the first battery pack and the second battery pack.

4. The battery discharge device of claim 3, wherein the balancing circuitry includes balance charging circuitry and is configured to power the balance charging circuitry from energy drawn from the higher SOC battery pack to charge the lower SOC battery pack.

5. The battery discharge device of claim 4, further comprising:
charging circuitry electrically connected to the first battery pack and the second battery pack in a parallel-type connection, the charging circuitry configured to simultaneously and independently charge the first battery pack and the second battery pack from power drawn from an external power source.

6. The battery discharge device of claim 1, wherein the balancing circuitry is configured to transfer energy between the first battery pack and the second battery pack when the battery discharge device is not being discharged.

7. The battery discharge device of claim 1, further comprising a controller, wherein the controller is configured to:
determine a non-use condition of the discharge circuitry, and
operate the balance circuitry to transfer energy between the first battery pack and the second battery pack during the non-use condition.

8. The battery discharge device of claim 1, further comprising a switch that is configured to be controlled to electrically disconnect one of the first battery pack and the second battery pack from the series-type connection during discharge based on a state of the one of the first battery pack and the second battery pack,
wherein the other of the first battery pack and the second battery pack is maintained in the series-type connection during discharge.

9. The battery discharge device of claim 1, wherein the output terminal is configured to provide the output voltage to the powered device such that the output voltage is operable as a power source for a heavy-duty, high-voltage power tool selected from the group consisting of: a miter saw, a planer, a band saw, a diamond coring motor, a drill, a grinder, a magnetic drill press, a rotary hammer, a demolition hammer, a compressor, a string trimmer, a blower, a hedge trimmer, a lawn mower, a chain saw, a pressure washer, a wood chipper, and a snow blower.

10. The battery discharge device of claim 1, wherein the output terminal is configured to provide the output voltage to the powered device such that the output voltage is selected from the group consisting of 110 V, 240 V and 400 V.

11. The battery discharge device of claim 1, wherein the first battery pack has a first initial state of charge (SOC) and the second battery pack has a second initial SOC different than the first initial SOC.

12. The battery discharge device of claim 1, wherein:
the first battery pack has a first capacity and a first nominal voltage and the second battery pack has a second capacity and a second nominal voltage; and
at least one of the first capacity is different than the second capacity or the first nominal voltage is different than the second nominal voltage.

13. A method of operating a battery discharge device, the method comprising:
receiving, at a first support, a first battery pack;
receiving, at a second support, a second battery pack;
selectively electrically connecting the first battery pack to the second battery pack in a series-type electrical connection during a discharge, wherein the discharge includes outputting an output voltage to a powered device; and
selectively transferring energy between the first battery pack and the second battery pack.

14. The method of claim 13, wherein the selectively transferring of the energy between the first battery pack and the second battery pack includes transferring energy from a higher state of charge (SOC) battery pack of the first battery pack and the second battery pack, to a lower SOC battery pack of the first battery pack and the second battery pack.

15. The method of claim 13, further comprising simultaneously and independently charging the first battery pack and the second battery pack from power drawn from an external power source.

16. The method of claim 13, further comprising:
determining a non-discharge condition of the battery discharge device; and
transferring energy between the first battery pack and the second battery pack during the non-discharge condition.

17. A system comprising:
a first battery pack including a first battery pack housing and a first battery cell contained within the housing;
a second battery pack including a second battery pack housing and a second battery cell contained within the housing; and
a battery discharge device including a housing defining a first support operable to support the first battery pack housing, and a second support operable to support the second battery pack housing, discharging circuitry selectively connecting to the first battery pack and the second battery pack in a series-type connection during a discharge, and balance circuitry selectively connectable to the first battery pack and the second battery pack, wherein:
the discharge circuitry includes an output terminal to provide an output voltage to a powered device, and
the balance circuitry is operable to transfer energy between the first battery pack and the second battery pack.

18. The system of claim 17, wherein the balance circuitry is configured to transfer energy from a higher state of charge (SOC) battery pack of the first battery pack and the second battery pack, to a lower SOC battery pack of the first battery pack and the second battery pack.

19. The system of claim 17, wherein the battery discharge device further includes charging circuitry electrically connected to the first battery pack and the second battery pack in a parallel-type connection, the charging circuitry configured to simultaneously and independently charge the first battery pack and the second battery pack from power drawn from an external power source.

20. The system of claim 17, wherein:
the first battery pack has a first capacity and a first nominal voltage and the second battery pack has a second capacity and a second nominal voltage; and
at least one of the first capacity is different than the second capacity, or the first nominal voltage is different than the second nominal voltage.

* * * * *